United States Patent
Ficaro et al.

(10) Patent No.: US 7,394,920 B2
(45) Date of Patent: Jul. 1, 2008

(54) AUTOMATED COMPUTER-IMPLEMENTED METHOD AND SYSTEM FOR REORIENTING EMISSION COMPUTER TOMOGRAPHIC MYOCARDIAL PERFUSION IMAGES

(75) Inventors: Edward P. Ficaro, Pinckney, MI (US); James R. Corbett, Ann Arbor, MI (US)

(73) Assignee: Invia, LLC, Ann Arbor, MI (US)

( * ) Notice: Subject to any disclaimer, the term of this patent is extended or adjusted under 35 U.S.C. 154(b) by 953 days.

(21) Appl. No.: 10/849,619

(22) Filed: May 19, 2004

(65) Prior Publication Data
US 2005/0261577 A1 Nov. 24, 2005

(51) Int. Cl.
*G06K 9/00* (2006.01)
(52) U.S. Cl. .............................. 382/128; 378/4; 378/21; 378/901; 600/436
(58) Field of Classification Search ................. 382/128, 382/129, 130, 131, 132, 133, 134; 378/4, 378/21, 23, 24, 25, 26, 27, 46, 63, 90, 92, 378/98.6, 101, 901; 600/410, 425, 428, 436; 607/119, 122, 123, 125, 902; 128/920, 922
See application file for complete search history.

(56) References Cited

U.S. PATENT DOCUMENTS

| | | | |
|---|---|---|---|
| 5,758,645 A * | 6/1998 | Qian | 600/425 |
| 6,473,080 B1 | 10/2002 | Brown et al. | |
| 6,473,636 B1 * | 10/2002 | Wei et al. | 600/436 |
| 6,507,752 B1 | 1/2003 | Maeda | |
| 6,563,941 B1 * | 5/2003 | O'Donnell et al. | 382/131 |
| 6,571,343 B1 | 5/2003 | Johnson et al. | |
| 6,573,894 B1 | 6/2003 | Idaszak et al. | |
| 6,618,605 B1 * | 9/2003 | Wolff et al. | 600/410 |

OTHER PUBLICATIONS

Publication: Edward P. Ficaro et al., "Simultaneous Transmission/Emission Myocardial Perfusion Tomography", American Heart Association, Inc. (1996).
Users Manual for 4D-MSPECT, Version 2.5 (Jul. 25, 2003).

* cited by examiner

*Primary Examiner*—Abolfazl Tabatabai
(74) *Attorney, Agent, or Firm*—Brooks Kushman P.C.

(57) ABSTRACT

An automated computer-implemented method for reorienting ECT myocardial perfusion images of a heart LV. The method includes receiving variously oriented tomographic images; receiving LV long-axis, LV center and LV axial limits based on the images; receiving the endocardial surface of the LV based on the images; determining a reorientation slice range based on the center and axial limits of the LV; receiving slices (N) within the reorientation slice range; for each slice, determining a center coordinate x[i], y[i] based on the endocardial surface and the area of the slice within a reorientation slice range coordinate system; determining translation $\Delta x_i$, $\Delta y_i$ and rotation $\theta_x$, $\theta_y$ values based on center coordinates x[i=1 to N], y[i=1 to N] to reorient the LV long axis to the z-axis and its origin of a reference Cartesian coordinate system; and automatically reorienting and realigning the tomographic images based on the translation and rotation values.

14 Claims, 10 Drawing Sheets

AUTOMATED COMPUTER-IMPLEMENTED METHOD AND SYSTEM FOR REORIENTING EMISSION COMPUTER TOMOGRAPHIC MYOCARDIAL PERFUSION IMAGES

BACKGROUND OF THE INVENTION

1. Field of the Invention

One aspect of the present invention relates to an automated computer-implemented method and system reorienting emission computed tomographic (ECT), for example, single photon emission computer tomography (ECT) or position emission tomography (PET) heart images. More specifically, this invention relates to a method and system for aligning and centering ECT myocardial perfusion images.

2. Background Art

Emission computed tomographic (ECT) cardiac imaging can be used for the diagnosis of patients with coronary heart diseases (CHD), for example, patients with myocardial infarction or angina pectoris. An ECT heart study can be utilized to determine whether a patient's heart muscle or myocardium is healthy, diseased or scarred. In a typical study, two ECT image sets of a patient are acquired; the first after injection of a radiotracer of heart blood flow while the patient is at rest; the second after injection while the patient is performing a treadmill exercise stress test. If a particular region of the heart demonstrates reduced blood flow in both the rest and stress image sets, then it is likely that the heart muscle in that region is secured. If a particular region of the heart displays normal blood flow at rest but reduced blood flow in the stress image, this indicates that the coronary artery providing blood to that is at least partially blocked, narrowed or stenosed. If a particular region of the heart is bright or normally perfused in both the rest and stress images, it is likely that the blood supply is normal and that particular region or the heart is healthy.

Typically, two-dimensional ECT images (tomographic slices) are generated orthogonal to (short axis slices) and parallel to (horizontal and vertical long axis slices) the heart's left ventricular (LV) long axis. FIGS. 1a-1d depict a three-dimensional rendering of the left ventricle and the typical slicing of the left ventricle into short axis and horizontal end vertical long axis sections. FIG. 1a depicts a three-dimensional rendering of the LV within a coordinate system. A short axis slice is shown in FIG. 1b, a horizontal slice is shown in FIG. 1c, and a vertical long axis slice is shown in FIG. 1d. While a short axis slice, as depicted in FIG. 1b, is generally circular, the long axis slices, as depicted in FIGS. 1c and 1d are generally horseshoe shaped. Short axis two-dimensional images can be generated at discrete positions along the LV long axis between the base and apex of the heart, as depicted in FIG. 1a. Horizontal long axis images can be generated at discrete positions along the short axis of the heart between the anterior and posterior walls of the heart. Vertical long axis images can be generated at discrete positions along the short axis of the heart between the septal and lateral heart walls.

The optimal diagnostic accuracy of ECT myocardial perfusion studies requires the proper orientation, i.e. exact alignment, of the ECT images for visual and quantitative comparisons of one study to the other. Misalignment of the walls of the left ventricle between serial studies (e.g. stress and rest), can cause false diagnoses. Misalignment is commonly caused by failure to exactly position the patient in the ECT scanner for each of the two or more studies. In large and/or acutely ill patients this can be virtually impossible to accomplish. Misalignment also commonly occurs during the processing of the studies into tomographic slices. There have been many prior art proposals for minimizing the image artifacts caused by an inaccurate registration and alignment of patient studies.

The approaches proposed thus far usually necessitate manual and interactive efforts to address misalignment. In light of the foregoing, an automated method and system for realigning and centering ECT myocardial perfusion images is needed. What is needed is a computer-implemented method or system for automatic alignment and centering of ECT cardiac images about the heart's left ventricular (LV) long-axis.

SUMMARY OF THE INVENTION

One aspect of the present invention relates to a computer-implemented method and system for realigning and centering of ECT myocardial perfusion images. The present invention also includes a computer-implemented method and system for automatic realignment and centering of SPECT myocardial perfusion images about the left ventricle long-axis of the heart. One object of the present invention is to enhance reproducibility of quantitative measured ventricular perfusion and function.

According to one embodiment of the present invention, an automated computer-implemented method for reorienting ECT myocardial perfusion images of a left ventricle (LV) of a heart is disclosed. The method includes receiving variously oriented tomographic images of a reconstructed volume of a heart; determining or receiving the LV long-axis and LV center ($x_c$, $y_c$, $z_c$) and determining or receiving axial limits ($z_{apex}$ and $z_{base}$) of the LV based on the tomographic images; determining or receiving the endocardial surface of the LV based on the tomographic images; determining a reorientation slice range based on the center and axial limits of the LV; receiving or reconstructing a number of slices (N) within the reorientation slice range; for each slice i=1 to N, determining a center coordinate x[i], y[i] based on the endocardial surface and the area of the slice i within a reorientation slice range coordinate system; determining translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and automatically reorienting and realigning the tomographic images based on the translation values and rotation values to obtain reoriented ECT images reoriented and realigned to the long axis of the left ventricle.

The reorienting step can include realigning, co-registering and centering the variously oriented input tomographic images to obtain a plurality of oriented ECT images. The reorienting step can be performed using an affine transform. The method can further include determining functional parameters based on the reoriented ECT images. The method can further include determining perfusion parameters based on the reoriented ECT images. The variously oriented tomographic images are generated by perfusion imaging software.

According to another embodiment of the present invention, a computer-implemented system for reorienting ECT myocardial perfusion images of a left ventricle (LV) of a heart is disclosed. The system includes one or more computers, configured to: receive variously oriented tomographic images of a reconstructed volume of a heart; determine or receiving the LV long-axis and LV center ($x_c$, $y_c$, $z_c$) and determine or receive axial limits ($z_{apex}$ and $z_{base}$) of the LV based on the tomographic images; determine or receive the endocardial surface of the LV based on the tomographic images; determine a reorientation slice range based on the center and axial limits of the LV; receive or reconstruct a number of slices (N) within the reorientation slice range; for each slice i=1 to N, determine a center coordinate x[i], y[i] based on the endocardial surface and the area of the slice i within a reorientation slice range coordinate system; determine translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and automatically reorient and realign the tomographic images based on the translation values and rotation values to obtain reoriented ECT images reoriented and realigned to the long axis of the left ventricle.

The one or more computers can be configured to realign, co-register and center the variously oriented input tomographic images to obtain a plurality of oriented ECT images. The one or more computers can be further configured to reorient and realign the tomographic images using an affine transform. The one or more computers can be further configured to determine functional parameters based on the reoriented ECT images. The one or more computers can be further configured to determine perfusion parameters based on the reoriented ECT images. The variously oriented tomographic images are generated by perfusion imaging software.

According to yet another embodiment of the present invention, a computer-implemented apparatus for reorienting ECT myocardial perfusion images of a left ventricle (LV) of a heart is disclosed. The apparatus includes means for receiving variously oriented tomographic images of a reconstructed volume of a heart; means for determining or means for receiving the LV long-axis and LV center ($x_c$, $y_c$, $z_c$) and means for determining or means for receiving axial limits ($z_{apex}$ and $z_{base}$) Of the LV based on the tomographic images; means for determining or means for receiving the endocardial surface of the LV based on the tomographic images; means for determining a reorientation slice range based on the center and axial limits of the LV; means for receiving or means for reconstructing a number of slices (N) within the reorientation slice range; for each slice i=1 to N, means for determining a center coordinate x[i], y[i] based on the endocardial surface and the area of the slice i within a reorientation slice range coordinate system; means for determining translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and means for automatically reorienting and realigning the tomographic images based on the translation values and rotation values to obtain reoriented ECT images reoriented and realigned to the long axis of the left ventricle.

The means for reorienting can include a means for realigning, co-registering and centering the variously oriented input tomographic images to obtain a plurality of oriented ECT images. The means for reorienting can include a means for performing an affine transform. The apparatus can further include a means for determining functional parameters based on the reoriented ECT images. The apparatus can further include a means for determining perfusion parameters based on the reoriented ECT images. The variously oriented tomographic images are generated by perfusion imaging software.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

DETAILED DESCRIPTION OF EMBODIMENTS OF THE PRESENT INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention. Further, the image processing steps described below can be carried out automatically, using a computer such as computer 100 of FIG. 10. It is to be understood that persons skilled in the art understand how to program a computer, e.g., a computer program 102 of FIG. 10, to carry out these steps.

Figure 3:
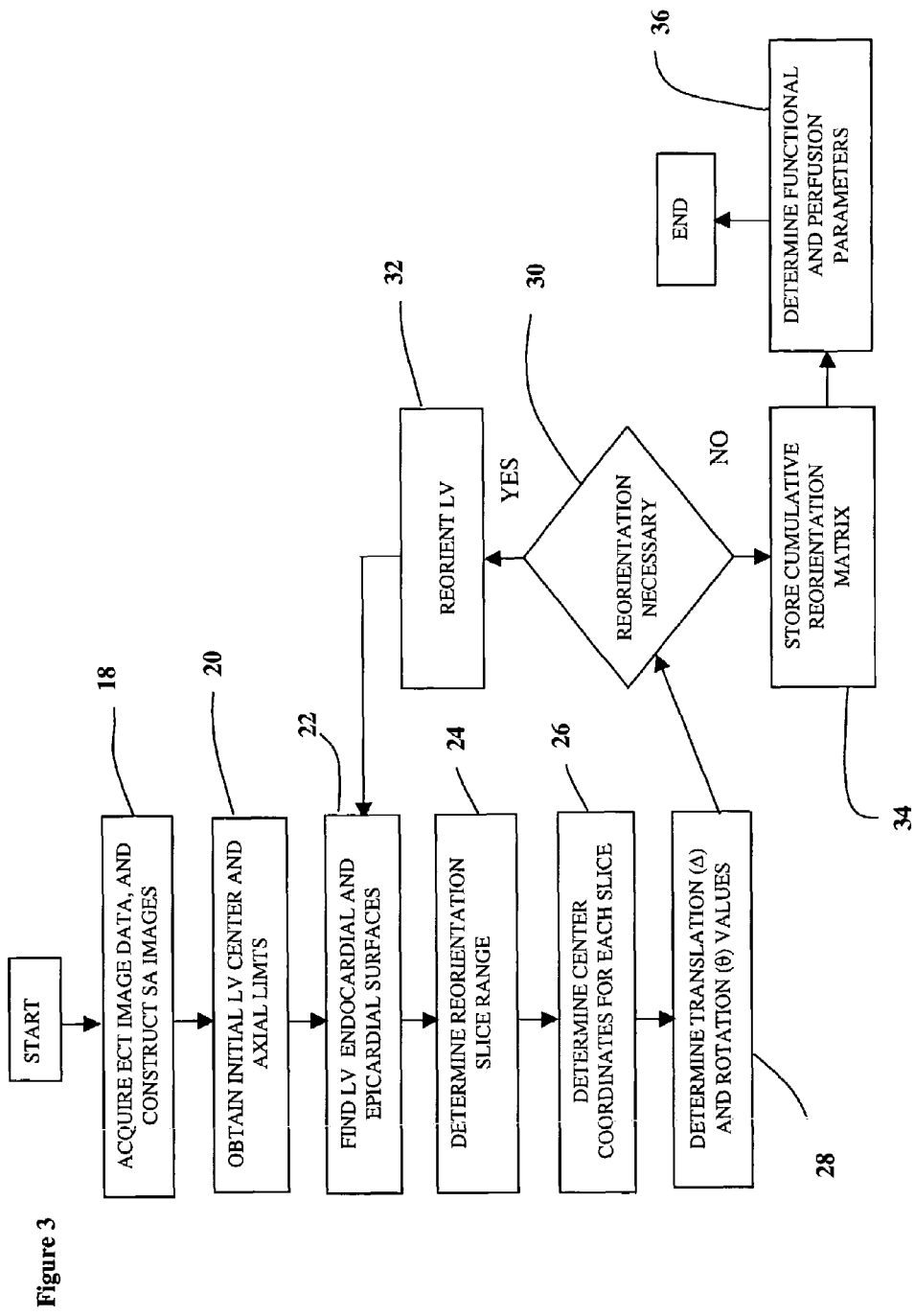
FIG. 3 depicts a flowchart of a reorienting process according to one embodiment of the present invention.
Figure 10:
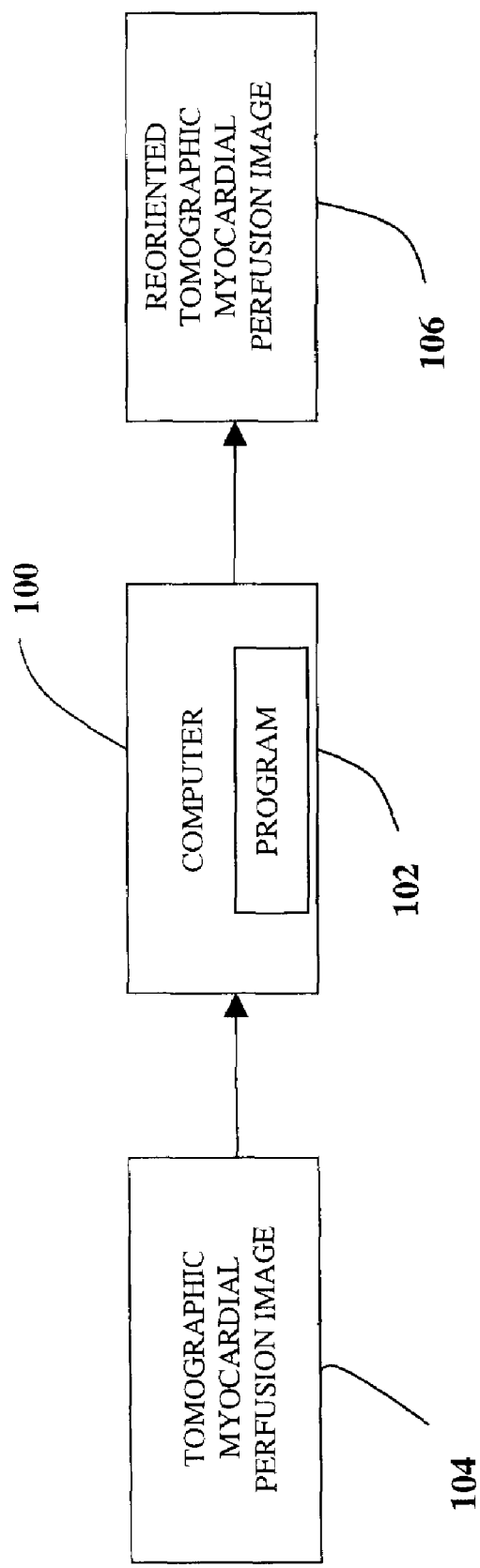
FIG. 10 depicts a computer for carrying out a reorienting process according to one embodiment of the present invention.

FIG. 3 depicts a flowchart of a reorienting process according to one embodiment of the present invention. As depicted in block 18 of FIG. 3, ECT image data for a patient is acquired during a myocardial ECT study of the heart. In certain embodiments, patients used in the study may have known or suspected coronary heart disease. Separate ECT images are acquired with the patient at (i) rest and at (ii) stress (e.g. during exercise). Block 104 of FIG. 10 depicts an example of acquiring computer tomographic myocardial perfusion images.

In certain embodiments, the patient can undergo a stress Sestamibi of 0.6 GBq to rest Tetrofosmin of 1.3 GBq study for acquiring data with a simultaneous transmission/emission (TCT/ECT) system. Such a system is disclosed by Ficaro, et al., in "Simultaneous Transmission/Emission Myocardial Perfusion Tomography", Circulation, 1996; 93:463-473, which is incorporated herein by reference. The following parameters can be used with the simultaneous TCT/ECT system: 360 degree orbit, 60 steps per detector, 16 seconds per step, 64 by 64 matrix size, and 6.3 millimeter pixel size. In certain embodiments, gated data can be reconstructed from 180 degrees projection image orbits from right anterior oblique (RAO) to left posterior oblique (LPO) using filtered back-projections. Transverse images can be filtered using a Butterworth filter with an order of about 5.0 and a cut-off of about 0.30.

Figure 1B:
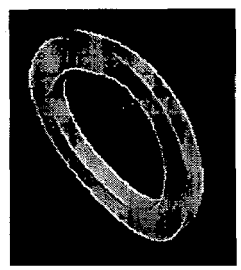
FIGS. 1a-1d depicts three-dimensional renderings and slices of a patient's left ventricle (LV)
Figure 1D:
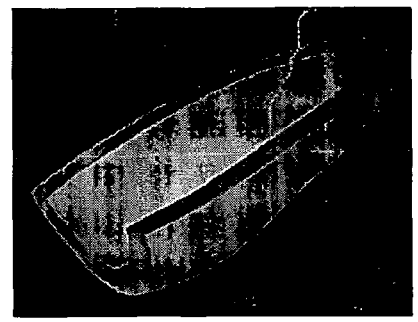
Figure 1A:
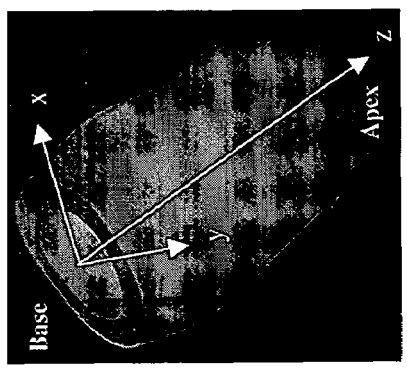
Figure 1C:
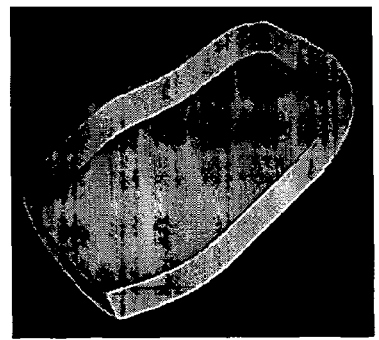
Figure 2C:
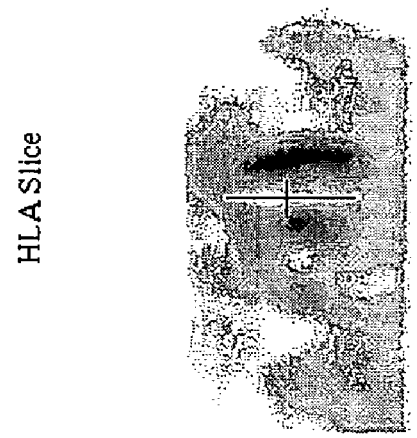
FIGS. 2a-2c depicts orthogonal slice views, i.e. ventricle long axis, mid short axis, and horizontal long axis, respectively, of the LV. The LV center of this particular example is X:33.0; Y:33.0 and Z:13.0.
Figure 2B:
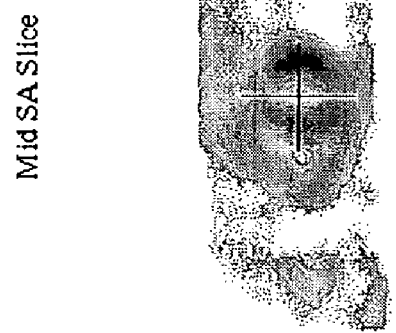
Figure 2A:
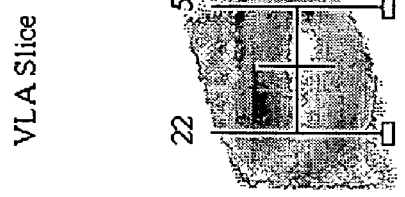

As depicted in block 20 of FIG. 3, the initial center and axial limits of the left ventricle of the heart are obtained. Turning to FIG. 2a, the axial limits are represented by slice positions 5 and 25 for the apex limit ($z_{apex}$) and base limit ($z_{base}$), respectively. While a user can input these values, the values can also be generated automatically from ECT images of the LV. For instance, to find $x_c$ and $y_c$, a summed image from the axial and mid-third of the short axis (SA) image volume is made. The initial estimate for $x_c$ is the first moment of a linegram constructed from the upper half of the summed image. The initial estimate for $y_c$ is the first moment of a linegram constructed from the right 5/8 of this summed image (columns 24-64 for a 64×64 image matrix). Using these seeds as the center of an 8×8 neighborhood, the final estimates for $x_c$ and $y_c$ are assigned by fitting an ellipse to the radial information from the circumferential profile analysis. For the axial estimates ($z_c$, $z_{apex}$, $z_{base}$), a linegram involving only the anterior portion of the mid-axial slice down to the $y_c$ estimate is used. A threshold of 55% of maximum activity is applied to the linegram, from which the $z_{apex}$ and $z_{base}$ are determined. The value for $z_c$ is the integral midpoint between $z_{apex}$ and $z_{base}$.

In block 22, the endocardial and epicardial surfaces of the left ventricle are determined. In certain embodiments, an LV surface detector can use a two-dimensional gradient image to determine initial estimates for the endocardial and epicardial surfaces. Weights based on activity, motion, and consistency of the endo- and epicardial surface estimates in space and time are assigned. A series of one- and two-dimensional weighted splines are used to refine the surfaces estimates. Since splines insure the continuity of the first derivative, the natural curvature of the myocardium is preserved even in the presence of large and severe perfusion defects. Using the new surface estimates, threshold values as a function of position are determined and used in conjunction with a morphological operator to create a segmented image of the LV volume. The segmented image is used for contiguity information in updating the spline weights, and the spline internolators are applied again to better refine the surface estimates utilizing the contiguity information. With the new surface estimates, the LV wall activity is fitted to a Gaussian function to estimate the mid-wall position and thickness. For gated studies, the volume curve is estimated to determine the end-diastolic (ED) and end-systolic (ES) frames. The average FWHM value for ED is used to determine the physical wall dimensions and is scaled to be an average thickness of 10 mm. Wall thickness estimates for the remaining frames in the R-R cycle are adjusted based on the wall thickness scale factor used at ED, and myocardial mass is conserved. For ungated studies, the average wall thickness is assigned to be 15 mm. The spline interpolating functions are used a final time to provide smooth estimates for the endocaridal, epicardial and wall thickness estimates.

In block 24, the slice range for reorientation is determined. A slice is a two-dimensional SA image of the LV. The slice range is a portion of the LV along the total length (L) in which the LV is a shape similar to a donut. Turning to FIG. 2a, the total length is represented by points 5 and 25, representing L=21 slices. The axial center of the LV is defined as slice position 15. In certain embodiments, the slice range can be about 45% of the LV length centered at the midpoint of the LV. In other words, the slice range is essentially 0.15 times L from the base to 0.60 times L from the base. For the study depicted in FIGS. 2a-2c, the slice range is from slices 12 to 22. This number of slices, 11, is defined as N. This slice range is typically selected because the LV is shaped similar to a cylinder and the endocardial and epicardial surfaces are elliptical in shape.

In block 26, center coordinates are determined for each slice i in N as defined in block 24. Using the endocardial surfaces, i.e. inner surfaces of the heart, the center coordinates x[i=1 to N], y[i=1 to N] for each SA slice in i=1 to N are determined from a fit of the surface points to an ellipse. In certain embodiments, the surface points are greater than or equal to 60.

According to block 28, translation ($\Delta$) values and rotation ($\theta$) values are determined. From the array of center coordinates, the rotation values $\theta_x$, $\theta_y$ and translation values $\Delta x$, $\Delta y$ along the x and y axes required to reorient the long axis of the heart to the z-axis can be determined. In certain embodiments, extreme values, defined as $\theta_x$, $\theta_y$ greater than about 10 degrees for rotation values or $\Delta x$, $\Delta y$ greater than 10 pixels for translation values, are dampened during this step of the process.

According to decision block 30, the process decides whether reorientation is necessary. In certain embodiments, any translation ($\Delta$) value greater than about 0.1 pixels or any rotation ($\theta$) value of greater than 0.1 degrees necessitates reorientation. If reorientation is necessary, the LV is reoriented, as depicted in block 32. The reorientation can include multiple steps. In certain embodiments, the first step is determining a reorientation matrix for reorienting the current LV volume based on $\theta_x$, $\theta_y$ and $\Delta x$, $\Delta y$. In certain embodiments, the second step is updating the cumulative reorientation matrix for reorienting the original LV volume. In certain embodiments, the third step includes updating the LV center by transforming original LV center position by using the cumulative reorientation matrix. These transformation steps can be performed by using an affine transform, although other transforms known in the art can also be utilized. Once the transformation is carried out, the steps described in blocks 22, 24, 26, and 28 are carried out until reorientation is not necessary. Once reorientation is not necessary, the cumulative reorientation matrix is stored, as depicted in block 34. According to block 36, functional and perfusion parameters can be determined for the reoriented ECT images. Block 106 of FIG. 10 depicts reoriented computer images as the output of program 102. Following is a non-limiting example of the beneficial results that can be obtained using the process identified in FIG. 3.

EXAMPLE

The patient population included thirty-one (31) consecutive patients with known or suspected coronary heart disease with no exclusions based on body habitus. Each patient underwent a stress Sestamibi of 0.6 GBq versus rest Tetrofosmin of 1.3 GBq study acquired with a simultaneous TCT/ECT system. The acquisition protocol included, but was not limited to, the following parameters: 360 degrees orbit, 60 steps per detector, 16 seconds per step, 64×64 matrix, 6.3 mm pixel size. Further, all gated data were reconstructed from 180 degrees projection image orbits from RAO to LPO using filtered back projection. Transverse images were filtered using a Butterworth filter (order 5.0, cut-off 0.30).

For each of the stress gated studies, three short axis (SA) volumes were constructed. Visually ideal alignment to the long axis of the heart, misaligned +/−5 degrees in the transaxial and sagittal oblique planes, misaligned +/−10 degrees in the transaxial and sagittal oblique planes were constructed. A single SA volume was constructed for the rest study.

The baseline for this example was no realignment. Functional and perfusion data were quantified using a software program, 4D-MSPECT, available from the University of Michigan (Ann Arbor, Mich.) which did not adjust for misalignment of the SA volume about the long axis.

Realigned image volumes were constructed using an automatic computer-implemented process of the present invention. Functional and perfusion data were quantified using the realigned image volumes.

The following parameters were investigated: left ventricular ejection fraction (EF), summed stress score (SSS) for perfusion, total perfusion defect extent, and total perfusion ischemic extent. For the misaligned (MA) and the auto-aligned (AA) (according to the present invention) data sets, maximal differences between the 3 stress data sets were recorded. Significant differences between the MA and AA data sets were determined using the Students t-test. Values of p less than about 0.05 were considered significant. Values of p less than about 0.05 were considered significant. The t-test determines the degree of correlation between two discrete variables. When the p-value, the result of this test, is less than 0.05, the probability is greater than a 95% that the MA and AA distributions are different.

Figure 4:
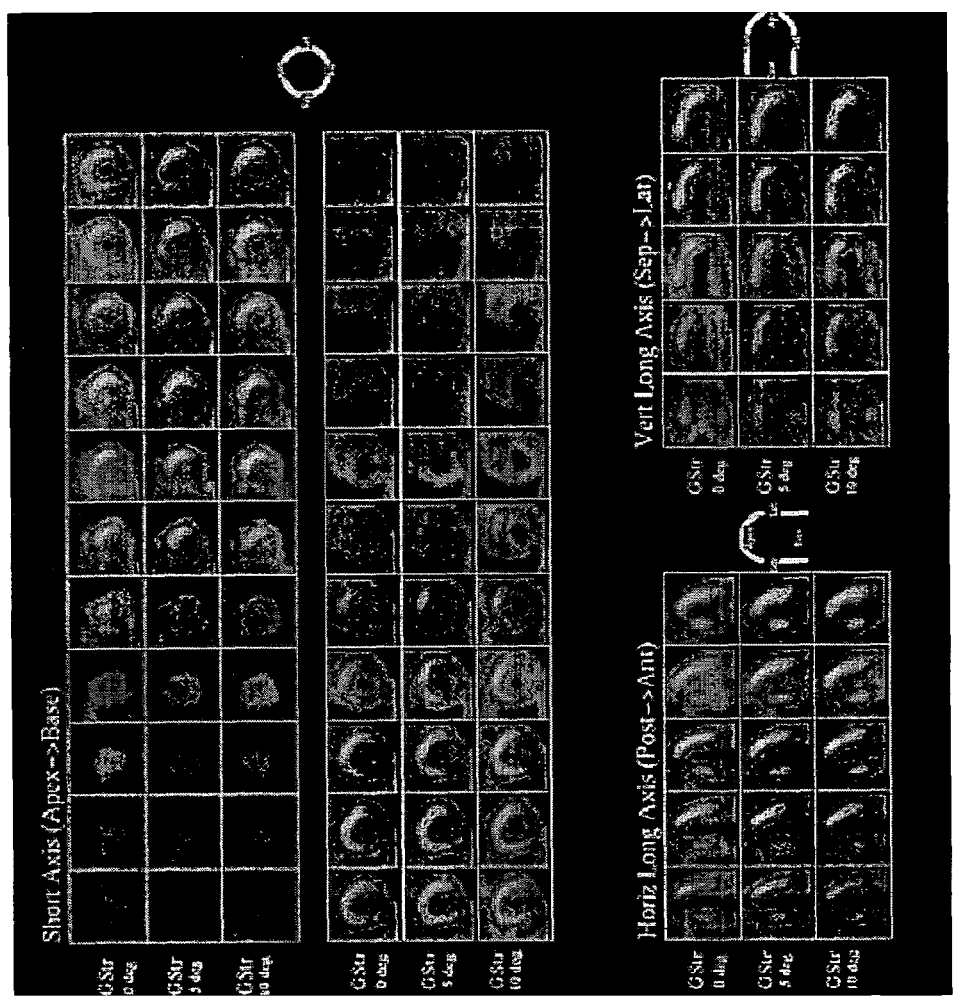
FIG. 4 depicts a splash display of images (short axis (SA), horizontal long axis (HLA), and vertical long axis (VLA)) with various rotational misalignments.

FIG. 4 depicts a splash display of images (SA, HLA, and VLA) with various rotational misalignments. The variability in EF values between the studies is substantial, that is, 41%, 39%, and 47%.

Figure 5:
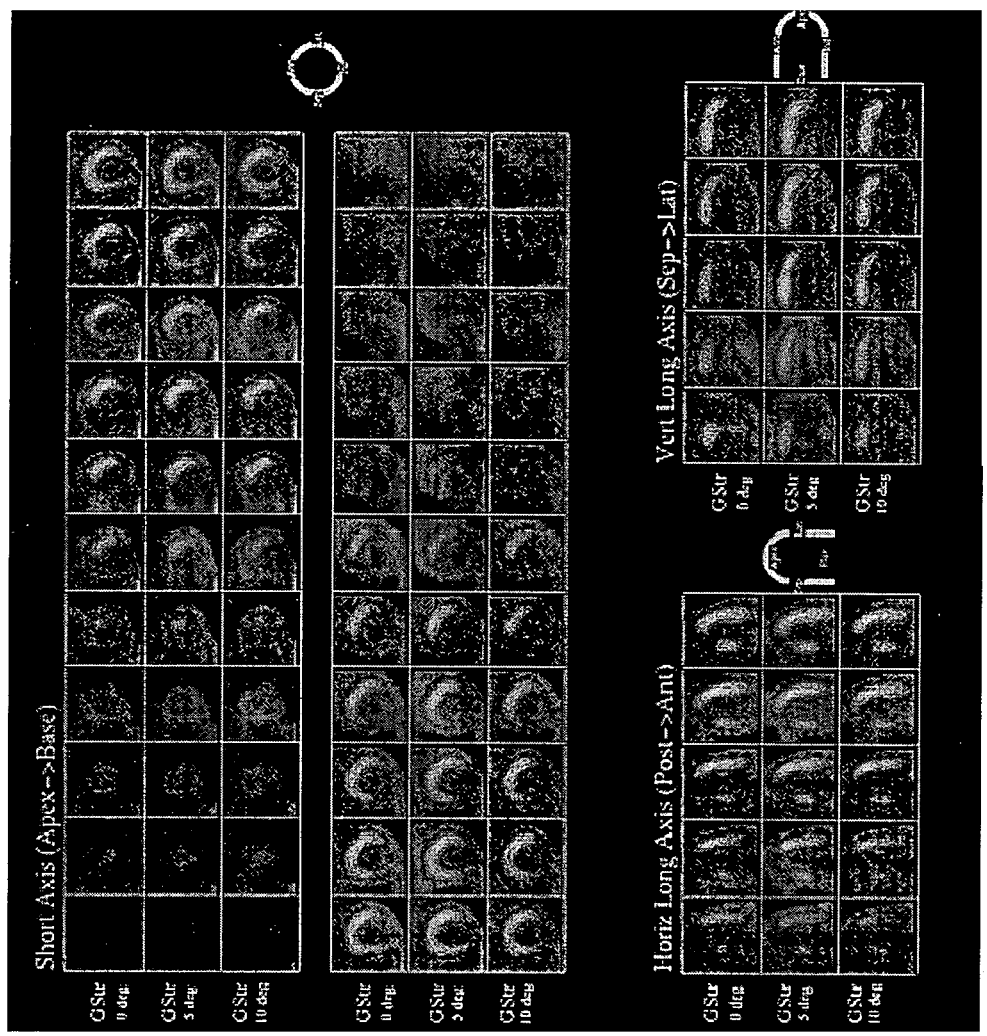
FIG. 5 depicts a splash display of images (SA, HLA, and VLA) that have been auto-realigned about the long axis of the heart.

FIG. 5 depicts a splash display of images (SA, HLA, and VLA) that have been auto-realigned about the long axis of the heart. The variability in EF values was substantially decreased relative to the EF values of FIG. 4, that is, 45%, 45%, and 43%.

Figure 6:
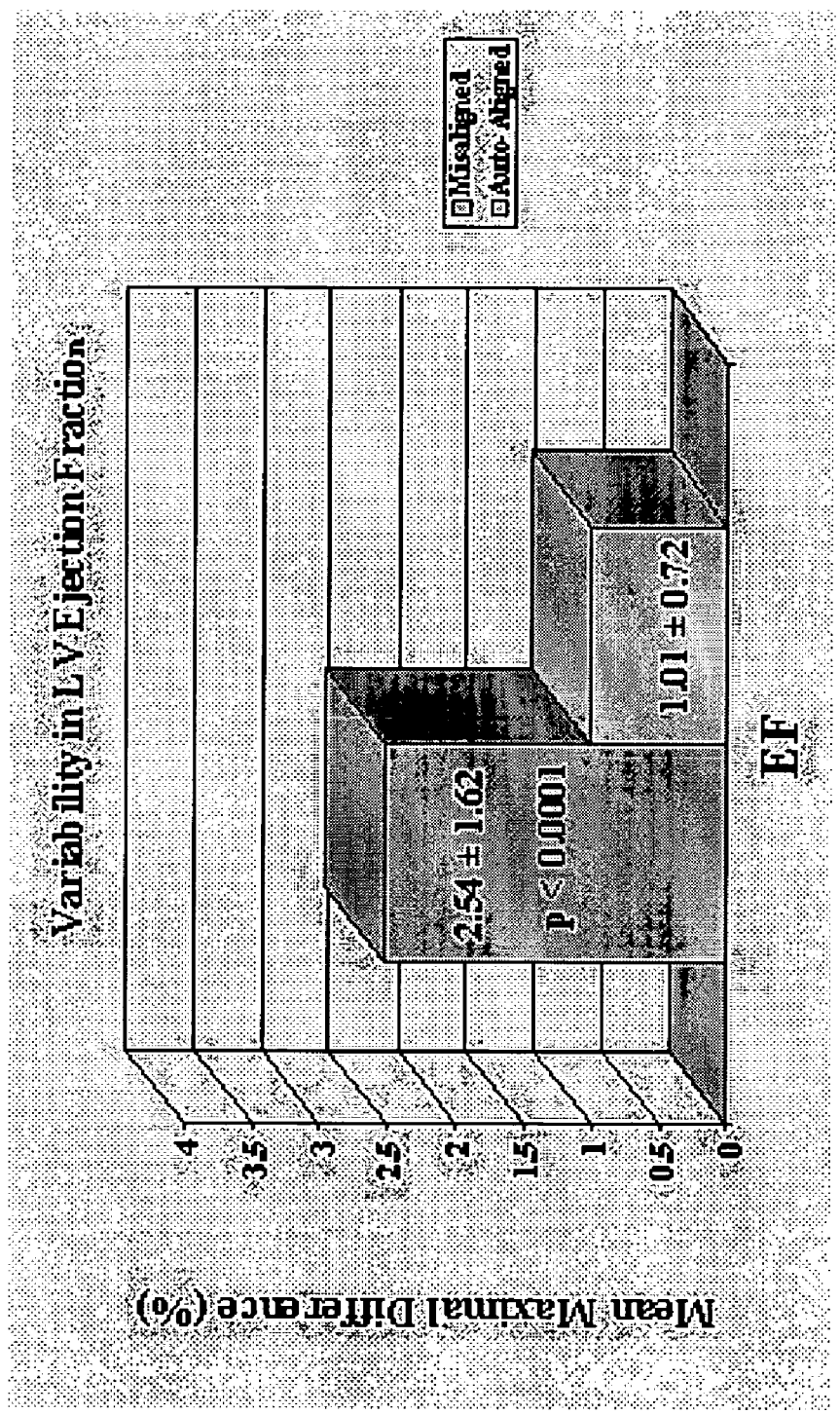
FIG. 6 depicts a graph showing the mean change in the functional estimates when the auto-realignment is employed.

FIG. 6 depicts a graph showing the mean change in the functional estimates when the auto-realignment is employed whereas the mean maximal difference percentage for EF based on the MA images was 2.54±1.62, the value for the AA images was 1.01±0.72.

Figure 7:
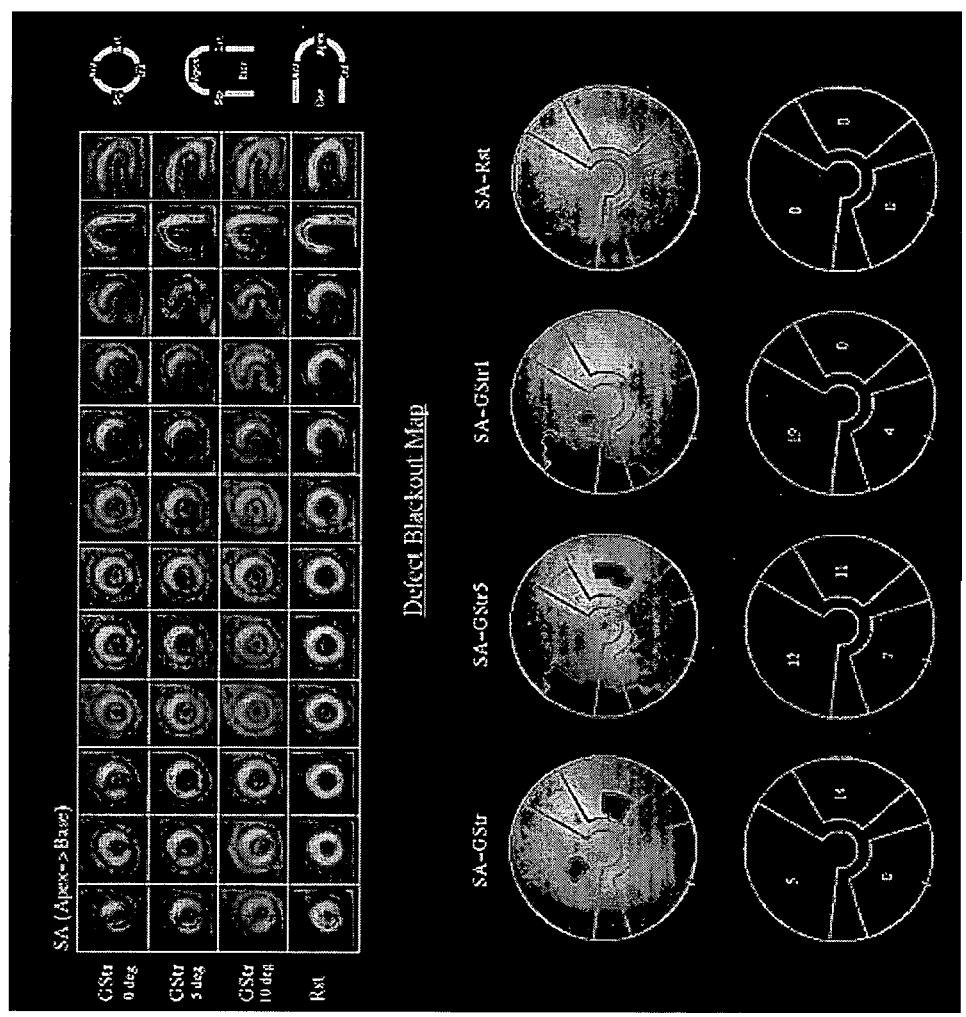
FIG. 7 shows a splash display of images (SA, HLA, and VLA) with various misalignments and corresponding defect blackout maps and regional defect extent values.

FIG. 7 shows a splash display of images (SA, HLA, and VLA) with various rotational misalignments and the corresponding defect blackout maps and regional defect extent values. For example, the SA G-Str 5 defect blackout may include vascular regions with 7% blackout, 1% blackout and 7% blackout. The blackout regions may cause a false diagnosis for coronary heart disease.

Figure 8:
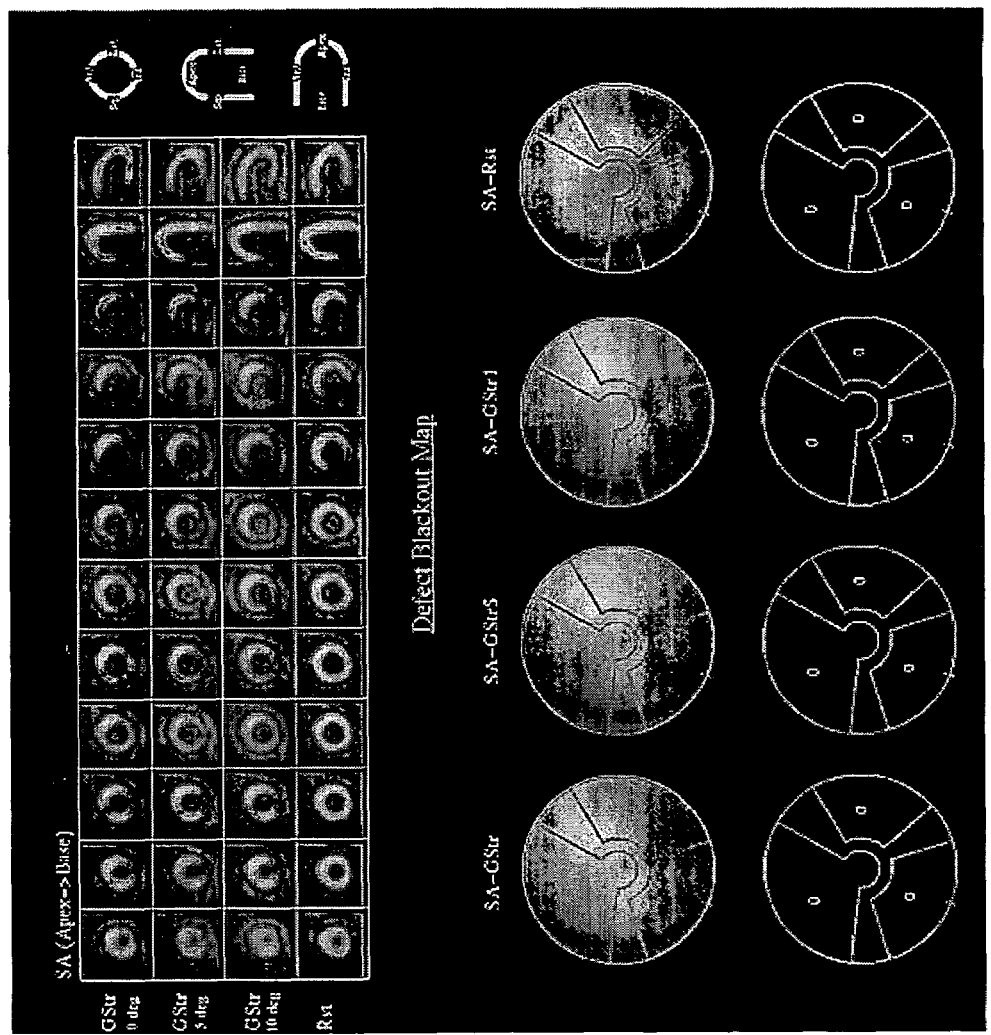
FIG. 8 shows a splash display of images (SA, HLA, and VLA) that have been auto-realigned about the long axis of the heart and the defect maps and extents have been recalculated.

FIG. 8 shows a splash of images (SA, HLA, and VLA) that have been auto-realigned about the long axis of the heart and the defect maps and extents have been recalculated. As can be seen by FIG. 8, the blackout maps show 0% blackout. The AA images result in less false diagnoses relative to the MA images of FIG. 7.

Figure 9:
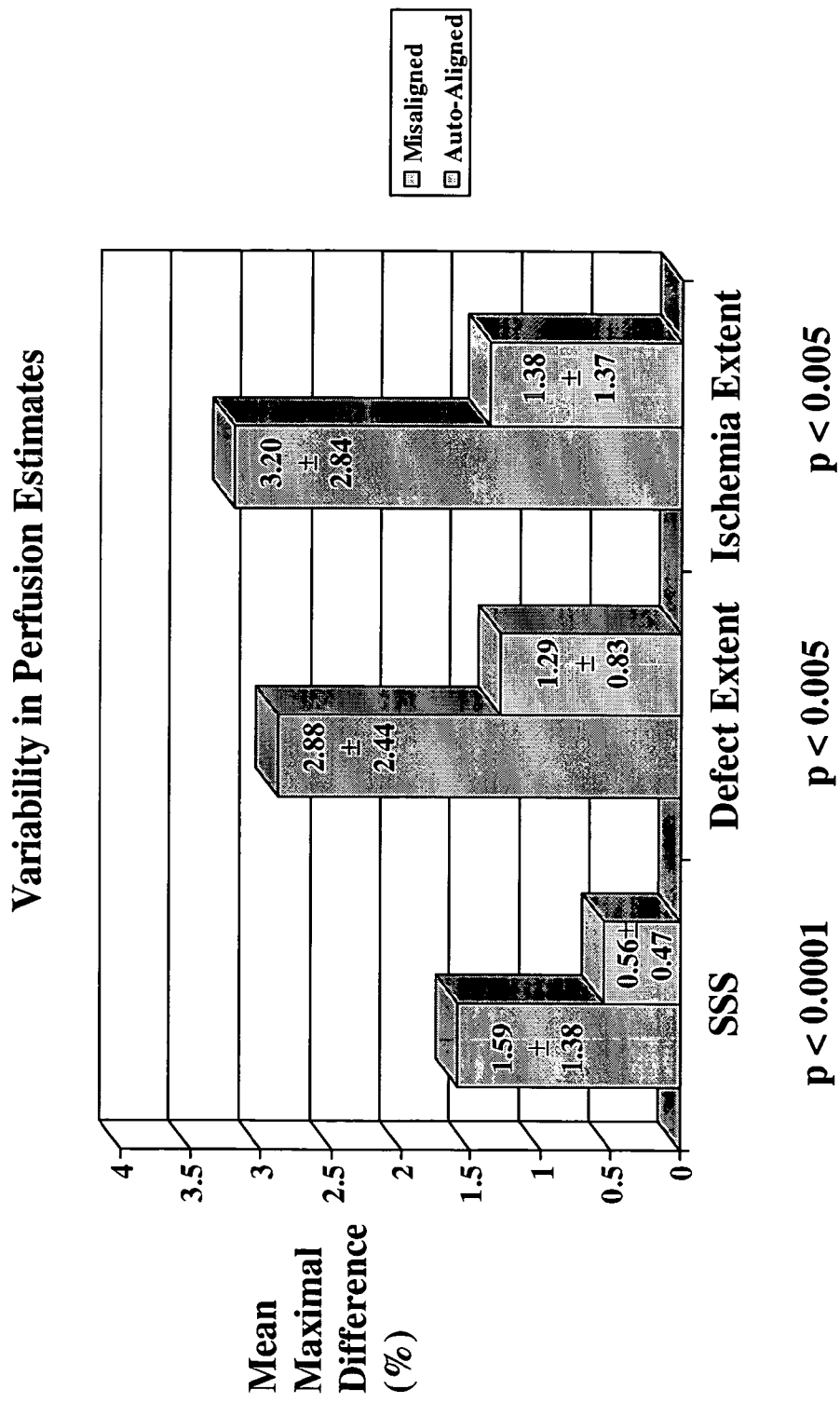
FIG. 9 depicts a graph showing the mean change in the perfusion estimates when the auto-realignment is employed.

FIG. 9 depicts a graph showing the mean change in the perfusion estimates when the auto-realignment is employed. The y-axis is the mean maximal differences percentage and the x axis is variability in perfusion estimated using MA and AA images for SSS, defect extent, and ischemia extent.

In addition to the results graphed in FIGS. 6 and 9, the automatically realigned image sets displayed no detectable differences compared to visual ideally reoriented images irrespective of the magnitude (less than about 10 degrees) and angles of misalignment. Further, regional differences by individual vascular territory were even greater and of clinically significant magnitudes compared to the global measures reported in FIGS. 6 and 9. Advantageously, means and standard deviations for each of the compared parameters were significantly reduced by automatic alignment including centering.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automated computer-implemented method for reorienting ECT myocardial perfusion images of a left ventricle (LV) of a heart, the method comprised of:

receiving variously oriented tomographic images of a reconstructed volume of a heart;

determining or receiving the LV long-axis and LV center ($x_c$, $y_c$, $z_c$) and determining or receiving axial limits ($z_{apex}$ and $z_{base}$) of the LV based on the tomographic images;

determining or receiving the endocardial surface of the LV based on the tomographic images;

determining a reorientation slice range based on the center and axial limits of the LV;

receiving or reconstructing a number of slices (N) within the reorientation slice range;

for each slice i=1 to N, determining a center coordinate x[i], y[i] based on the endocardial surface and the area of the slice i within a reorientation slice range coordinate system;

determining translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and automatically reorienting and realigning the tomographic images based on the translation values and rotation values to obtain reoriented ECT images reoriented and realigned to the long axis of the left ventricle.

2. The method of claim 1 wherein the reorienting step includes realigning, co-registering and centering the variously oriented input tomographic images to obtain a plurality of oriented ECT images.

3. The method of claim 1 wherein the reorienting step is performed using an affine transform.

4. The method of claim 1 further comprising determining functional parameters based on the reoriented ECT images.

5. The method of claim 1 further comprising determining perfusion parameters based on the reoriented ECT images.

6. The method of claim 1 wherein the variously oriented tomographic images are generated by perfusion imaging software.

7. A computer-implemented system for reorienting ECT myocardial perfusion images of a left ventricle (LV) of a heart, the system comprised of one or more computers, the one or more computers configured to:

receive variously oriented tomographic images of a reconstructed volume of a heart;

determine or receiving the LV long-axis and LV center ($x_c$, $y_c$, $z_c$) and determine or receive axial limits ($z_{apex}$ and $z_{base}$) of the LV based on the tomographic images;

determine or receive the endocardial surface of the LV based on the tomographic images;

determine a reorientation slice range based on the center and axial limits of the LV;

receive or reconstruct a number of slices (N) within the reorientation slice range;

for each slice i=1 to N, determine a center coordinate x[i], y[i] based on the endocardial surface and the area of the slice i within a reorientation slice range coordinate system;

determine translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and automatically reorient and realign the tomographic images based on the translation values and rotation values to obtain reoriented ECT images reoriented and realigned to the long axis of the left ventricle.

8. The system of claim 7 wherein the one or more computers is configured to realign, co-register and center the variously oriented input tomographic images to obtain a plurality of oriented ECT images.

9. The system of claim 7 wherein the one or more computers is further configured to reorient and realign the tomographic images using an affine transform.

10. The system of claim 7 wherein the one or more computers is further configured to determine functional parameters based on the reoriented ECT images.

11. The system of claim 7 wherein the one or more computers is further configured to determine perfusion parameters based on the reoriented ECT images.

12. The system of claim 7 wherein the variously oriented tomographic images are generated by perfusion imaging software.

13. An automated computer-implemented method for reorienting ECT myocardial perfusion images of a left ventricle LV) of a heart, the method comprised of:

receiving variously oriented tomographic images of a reconstructed volume of a heart generated by perfusion imaging software;

receiving the LV long-axis and LV center ($x_c$, $y_c$, $z_c$) and receiving axial limits ($z_{apex}$ and $z_{base}$) of the LV based on the tomographic images;

receiving the endocardial surface of the LV based on the tomographic images;

determining a reorientation slice range based on the center and axial limits of the LV;

receiving a number of slices (N) within the reorientation slice range;

for each slice i=1 to N, determining a center coordinate x[i], y[i] based on the endocardial surface and the area of the slice i within a reorientation slice range coordinate system;

determining translation values $\Delta x_i$, $\Delta y_i$ and rotation values $\theta_x$, $\theta_y$ based on the center coordinates x[i=1 to N], y[i=1 to N] to reorient the long axis of the LV to the z-axis and its origin of a reference Cartesian coordinate system; and automatically realigning, co-registering and centering the tomographic images based on the translation values and rotation values to obtain reoriented ECT images reoriented and realigned to the long axis of the left ventricle.

14. The method of claim 13 wherein the reorientation step is performed using an affine transform.

* * * * *